(12) United States Patent
DeMent et al.

(10) Patent No.: US 6,678,369 B2
(45) Date of Patent: Jan. 13, 2004

(54) NETWORK INTERFACE REDUNDANCY

(75) Inventors: Jeffrey M. DeMent, Hoffman Estates, IL (US); Tedd R. Pierce, Des Plaines, IL (US); Jeffrey M. Putnam, Lake in the Hills, IL (US); Daniel S. Rothschild, Chicago, IL (US); Stephen F. Witt, Skokie, IL (US)

(73) Assignee: NMS Communications Corporation, Framingham, MA (US)

( * ) Notice: Subject to any disclaimer, the term of this patent is extended or adjusted under 35 U.S.C. 154(b) by 397 days.

(21) Appl. No.: 09/877,501

(22) Filed: Jun. 8, 2001

(65) Prior Publication Data

US 2003/0028635 A1 Feb. 6, 2003

Related U.S. Application Data

(60) Provisional application No. 60/210,817, filed on Jun. 9, 2000.

(51) Int. Cl.[7] ............................................... H04M 7/00

(52) U.S. Cl. .............................. 379/221.03; 349/221.1

(58) Field of Search ........................ 379/221.1, 221.01, 379/221.03

(56) References Cited

U.S. PATENT DOCUMENTS 6,327,260 B1 * 12/2001 McGrew ..................... 370/385

* cited by examiner

*Primary Examiner*—Creighton Smith
(74) *Attorney, Agent, or Firm*—Mintz, Levin, Cohn, Ferris, Glovsky and Popeo, P.C.

(57) ABSTRACT

A signal system 7 (SS7) processing system for use in an SS7 network includes a primary interface configured to process communications according to at least one layer of the SS7 protocol stack, the primary interface being configured to provide checkpoint messages relating to the communications and the at least one layer of the SS7 protocol stack, each layer of the at least one layer of the SS7 protocol stack having a corresponding set of information associated with each communication, and a backup interface configured to process communications according to the at least one layer of the SS7 protocol stack, the backup interface being coupled to the primary interface, and configured, to receive the checkpoint messages from the primary interface, wherein the checkpoint messages contain sufficient information for the backup interface to properly process communications that are transferred from being processed by the primary interface to being processed by the backup interface and contain less than all information in each set of information associated with each of the communications corresponding to the at least one layer of the SS7 protocol stack.

36 Claims, 6 Drawing Sheets

NETWORK INTERFACE REDUNDANCY

CROSS-REFERENCE TO RELATED ACTIONS

This application claims the benefit of U.S. Provisional Application Serial No. 60/210,817 filed Jun. 9, 2000 and entitled "NETWORK INTERFACE REDUNDANCY."

FIELD OF THE INVENTION

The invention relates to telecommunications and more particularly to redundant interfaces for telecommunications in the Signaling System 7 network.

BACKGROUND OF THE INVENTION

In telecommunications systems, data are transmitted between endpoints. Endpoints include, e.g., telephones (including cellular phones), voicemail systems, fax machines, email addresses, and computers.

During transit, the data are processed through various apparatus according to protocols and/or techniques and/or guidelines for switching the data among system components. One such signaling system is called the Signal System #7 (SS7). SS7 implements portions of the International Organization for Standardization (ISO) Open System Interconnection (OSI) seven layer protocol model.

Reliability of data transmission is important for telecommunications systems. Users of telecommunications systems need the data to be transmitted accurately and quickly (e.g., for faxes and telephone conversations). Thus, it is desirable to help ensure that failures in the telecommunications systems do not result in significant losses of data or time to transmit data.

The Signaling System 7 (SS7) network is a packet-based data network used worldwide to support the signaling requirements of modern telecommunications networks. The SS7 network interconnects various pieces of equipment used to provide telecommunications services. Examples of the services supported by the SS7 network include call supervision signaling for the support of local, long-distance, and international calling, signaling for the support of registration, inter-cell handoff, and roaming in wireless (cellular) networks, and transaction-based signaling for the support of enhanced services such as network voicemail, free phone (800-number) calling, caller ID display, pre-paid calling cards, and local number portability.

The SS7 network includes a set of equipment nodes interconnected by sets of signaling data links. The equipment nodes can be classified as either signal transfer points (STPs) or signaling end points (SEPs). The STPs are switches or routers that provide for reliable transfer of signaling packets, or messages, between the SEPs. The SEPs implement the actual telecommunications services described above. Typical signaling end points are telephone switching systems (e.g. Service Switching Points (SSPs)), mobile switching centers (in cellular networks), service nodes (SNs) providing enhanced voice services, database systems holding subscriber information, Intelligent Peripherals (IPs), and Service Control Points (SCPs).

In order to meet the service availability goals for telecommunications equipment/service providers, or in some cases to meet regulatory requirements, stringent reliability requirements are placed on the SS7 network. Signaling nodes must be designed for up to 99.999% availability, equating to less than 6 minutes of down time per year. Each SEP is typically connected to at least 2 STPs, using groups of redundant signaling links that share the traffic load, to guard against the failure of a single signaling link, or even an entire STP, from causing a complete service outage.

SUMMARY OF THE INVENTION

In general, in an aspect, the invention provides a signaling system 7 (SS7) processing system for use in an SS7 network. The system includes a primary interface configured to process communications according to at least one layer of the SS7 protocol stack, the primary interface being configured to provide checkpoint messages relating to the communications and the at least one layer of the SS7 protocol stack, each layer of the at least one layer of the SS7 protocol stack having a corresponding set of information associated with each communication, and a backup interface configured to process communications according to the at least one layer of the SS7 protocol stack, the backup interface being coupled to the primary interface, and configured, to receive the checkpoint messages from the primary interface, wherein the checkpoint messages contain sufficient information for the backup interface to properly process communications that are transferred from being processed by the primary interface to being processed by the backup interface and contain less than all information in each set of information associated with each of the communications corresponding to the at least one layer of the SS7 protocol stack.

Implementations of the invention may include one or more of the following features. The primary interface and the backup interface are each configured to process communications according to at least two layers of the SS7 protocol stack. The primary interface and the backup interface are each configured to process communications according to message transfer part 3 (MTP-3), signaling connection control part (SCCP), integrated services digital network user part/telephone user part (ISUP/TUP), and transaction capabilities application part (TCAP) layers of the SS7 protocol stack. The backup interface is configured to initialize the MTP-3, SCCP, ISUP/TUP, and TCAP layers to default conditions. The backup interface is configured to request update checkpoint messages from the primary interface to alter the MTP-3, SCCP, ISUP/TUP, and TCAP layers of the backup interface from the default conditions. The backup interface is configured such that the MTP-3, SCCP, ISUP/TUP, and TCAP layers of the backup interface independently request the update checkpoint messages from corresponding layers of the primary interface. The backup interface is configured to request the update checkpoint messages in response to the backup interface being restored to service. The primary interface is configured to provide the update checkpoint messages intermixed with normal-operation checkpoint messages.

Implementations of the invention may also include one or more of the following features. The checkpoint messages contain only information sufficient for the backup interface to properly process communications that are transferred from being processed by the primary interface to being processed by the backup interface. The at least one layer includes a message transfer part 3 (MTP-3) layer and wherein the primary interface is configured to provide a first MTP-3 checkpoint message portion, of a checkpoint message, consisting of a link number and a new link state associated with a signaling link over which the associated communication is transferred in response to the signaling link changing states, and wherein the primary interface is configured to provide a second MTP-3 checkpoint message portion, of a checkpoint message, consisting of an address of a destination signaling point in the SS7 network and an address of a signal transfer point adjacent to the destination signaling point in response to at least one of accessibility of and a preferred route to the destination signaling point changing. The at least one layer includes a message transfer part (MTP) and a signaling connection control part (SCCP) layer and wherein the primary interface is configured to provide, in response to changes in status of the SS7 network, and SCCP network-status checkpoint message portion, of a checkpoint message, checkpointing MTP-pause and MTP-resume local to the primary interface in the SS7 network, SSA and SSP remote from the primary interface in the SS7 network, and subsystem in-service and subsystem out-of-service requests from an application local to the primary interface in the SS7 network. The at least one layer includes a signaling connection control part (SCCP) layer and wherein the primary interface is configured to provide, in response to a communication connection being confirmed or released, an SCCP connection checkpoint message portion, of a checkpoint message, including calling and called SCCP addresses, connection direction, connection service class, source and destination local references, SLS value, and identity of an application local to the primary interface in the SS7 network. The at least one layer includes a transaction capabilities application part (TCAP) layer and wherein the primary interface is configured to provide a TCAP checkpoint message portion, of a checkpoint message, to replicate states of open transactions in the backup interface. The TCAP checkpoint message portion consists of, in response to a call being initiated, source transaction identity, destination transaction identity, transaction state, source address, and destination address.

Implementations of the invention may also include one or more of the following features. The TCAP checkpoint message portion consists of, after a call has been initiated, transaction identity. The primary and backup interfaces are disposed in a common computer chassis. The primary and backup interfaces are disposed in separate computer chassis. The backup is configured to assume processing of communications previously being processed by the primary interface in response to the primary interface changing from active to at least imminently inactive status.

In general, in another aspect, the invention provides a signaling system 7 (SS7) processing system for use in an SS7 network, the system including a primary interface configured to process communications according to at least a physical-interface layer, a message transfer part 2 (MTP-2) layer and an MTP-3 layer of the SS7 protocol stack, the physical-interface layer of the primary interface being coupled to first SS7 links for conveying information between the primary interface and other portions of the SS7 network, and a backup interface configured to process communications according to the at least the physical-interface layer and the MTP-2 layer of the SS7 protocol stack, the backup interface being coupled to the primary interface to transfer data between the MTP-2 layer of the backup interface and the MTP-3 layer of the primary interface, the physical-interface layer of the backup interface being coupled to second SS7 links for conveying information between the backup interface and other portions of the SS7 network, wherein the primary and backup interfaces are configured to have the physical-layer interfaces of both the primary and backup interfaces concurrently convey information to and from the first and second SS7 links, respectively.

Implementation of the invention may include one or more of the following features. The primary and backup interfaces are configured to process communications according to the at least the physical-interface layer, the MTP-2 layer, the MTP-3 layer, an SCCP layer, an ISUP/TUP layer, and a TCAP layer of the SS7 protocol stack. The backup interface is configured to, while the primary interface is active, process information received from the second SS7 links through the MTP2 layer and convey the processed information to the MTP-3 layer of the primary interface. The primary and backup interfaces are configured such that the physical layers and MTP2 layers of both interfaces can convey information to active upper layers of the other interface.

Implementations of the invention may also include one or more of the following features. The backup interface includes a buffer, the backup interface being configured to store information received via the second SS7 links in the buffer in response to an interface-communications failure between the primary and backup interfaces via an interface link coupling the primary and backup interfaces. The backup interface is configured to provide processor-outage indicia, associated with the second SS7 links, to a signaling point in the SS7 network adjacent to the backup interface in response to the interface-communications failure. The backup interface is configured to stop providing processor-outage indicia, associated with the second SS7 links, to the signaling point in the SS7 network adjacent to the backup interface in response to the interface-communications failure ceasing. The backup interface is configured to switch to a primary mode and to stop providing processor-outage indicia, associated with the second SS7 links, to the signaling point in the SS7 network adjacent to the backup interface in response to the primary interface being at least imminently inactive.

Implementations of the invention may also include one or more of the following features. The primary and backup interfaces are disposed in a common computer chassis. The primary and backup interfaces are disposed in separate computer chassis. The backup is configured to assume processing of communications previously being processed by the primary interface in response to the primary interface changing from active to at least imminently inactive status.

In general, in another aspect, the invention provides a signaling system 7 (SS7) processing system for use in an SS7 network, the system including a primary interface configured to process communications according to at least a physical-interface layer, a message transfer part 2 (MTP-2) layer and an MTP-3 layer of the SS7 protocol stack, the physical-interface layer of the primary interface being coupled to first SS7 links for conveying information between the primary interface and other portions of the SS7 network, the primary interface being configured to provide checkpoint messages relating to the communications and the MTP-3 layer of the SS7 protocol stack, the MTP-3 layer having a corresponding MTP-3 set of information associated with each communication, the primary interface being configured to communicate with a first service application, and a backup interface configured to process communications according to the at least the physical-interface layer, the MTP-2 layer and the MTP-3 layer of the SS7 protocol stack, the backup interface being coupled to the primary interface to transfer data between the MTP-2 layer of the backup interface an the MTP-3 layer of the primary interface, the physical-interface layer of the backup interface being coupled to second SS7 links for conveying information between the backup interface and other portions of the SS7 network, the backup interface being coupled to the primary interface, and configured, to receive the checkpoint messages from the primary interface, the backup interface being configured to communicate with a second service application, wherein the primary and backup interfaces are configured to have the physical-layer interfaces of both the primary and backup interfaces concurrently convey information to and from the first and second SS7 links, respectively, and wherein the checkpoint messages contain sufficient information for the backup interface to properly process communications that are transferred from being processed by the primary interface to being processed by the backup interface and contain less than all information in each MTP-3 set of information associated with each of the communications corresponding to the MTP-3 layer of the SS7 protocol stack.

Implementations of the invention may include one or more of the following features. The primary interface and the backup interface are each configured to process communications according to signaling connection control part (SCCP), integrated services digital network user part/ telephone user part (ISUP/TUP), and transaction capabilities application part (TCAP) layers of the SS7 protocol stack. The primary interface is configured to provide checkpoint messages relating to the communications and each of the SCCP, ISUP/TUP, and TCAP layers of the SS7 protocol stack, each layer having a corresponding set of information associated with each communication. The checkpoint messages contain only information sufficient for the backup interface to properly process communications, according to each layer, that are transferred from being processed by the primary interface to being processed by the backup interface.

Implementations of the invention may also include one or more of the following features. The primary and backup interfaces are disposed in a common computer chassis and the first service application is the second service application. The primary and backup interfaces are disposed in separate computer chassis and the first and second service applications are separate. The backup is configured to assume processing of communications previously being processed by the primary interface in response to the primary interface changing from active to at least imminently inactive status.

Various aspects of the invention may provide one or more of the following advantages. The invention helps provide highly-available network interfaces for telecommunications systems including switching systems, enhanced services platforms such as network voicemail systems or debit card platforms, and wireless network infrastructure such as mobile switching centers and base station controllers. Telecommunications systems can continue to operate during failures within the systems. Telecommunication systems can continue to provide services during live upgrades to the systems (e.g., upgrades to existing, currently-operating systems) and during reconfigurations. SEPs can be constructed from, and/or provided by, e.g., telecommunications equipment/service providers, one or more off-the-shelf mass-market computers while meeting 99.999% availability specifications. End users need not provision spare SS7 links, saving money on unused links and time to change links.

These and other advantages of the invention, along with the invention itself, will be more fully understood after a review of the following figures, detailed description, and claims.

DETAILED DESCRIPTION OF PREFERRED EMBODIMENTS

The invention provides for high-availability of telecommunications systems. In particular, the invention provides telecommunications systems including redundant signaling systems interfaces, and redundant signaling system interfaces for use in telecommunication systems. Redundant signaling system interface boards are provided and linked together. The redundant boards are both active for portions of a protocol implemented by the boards and configured for other portions of the protocol such that one board is active and the other is a backup. The board acting as the backup receives state updates from the active board through the link between the boards to keep the backup board ready to quickly transition to being the active board, e.g., if the active board fails or is taken off-line for an upgrade.

Figure 1:
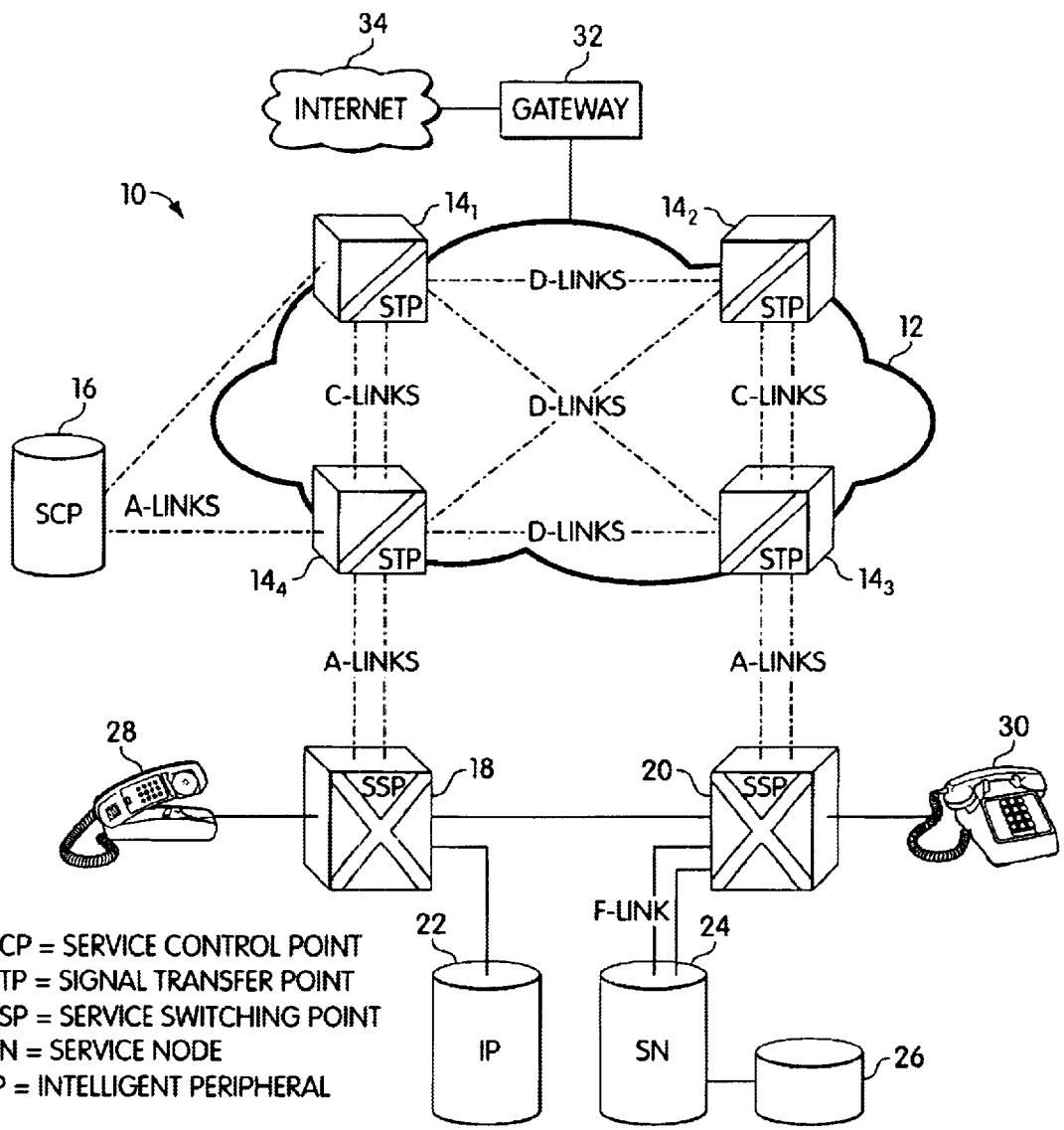
FIG. 1 is a block diagram of a telecommunications system.

Referring to FIG. 1, a signaling network system 10 includes a set 12 of four (here) STPs $14_1$–$14_4$, an SCP 16, two SSPs 18, 20, an IP 22, an SN 24, a data storage device 26, and telephones 28, 30. The components of the system 10 are connected as shown through bi-directional telecommunications links. The STPs 14 are routers and the SCP 16 is a database holding data used to implement enhanced calling services such as 800 number calling, calling card validation, and local number portability. The SSPs 18, 20, are, e.g., central-office voice switches and the IP 22 and SN 24 are computing and/or switching platform for implementing enhanced services such as voicemail, prepaid calling cards, and voice-activated dialing. The system 10 also includes a gateway 32 connected to the set 12 for connecting to outer types of data networks, such as global packet-switched network known as the Internet 34 (as shown) or a wireless network. The set 12 may be part of a Public-Switched Telephone Network (PSTN).

The SCP 16 and SSPs are source and destination devices (SEPs) and are connected to each other indirectly through STPs. SEPs are generally directly connected via links to at least two STPs or other SEPs. The IP 22 and SN 24 are shown directly connected to SSPs 18, 20, respectively, although they may be connected through STPs. The STPs 14 are cross-connected to each other in a redundant fashion, which can help improve reliability.

Figure 2:
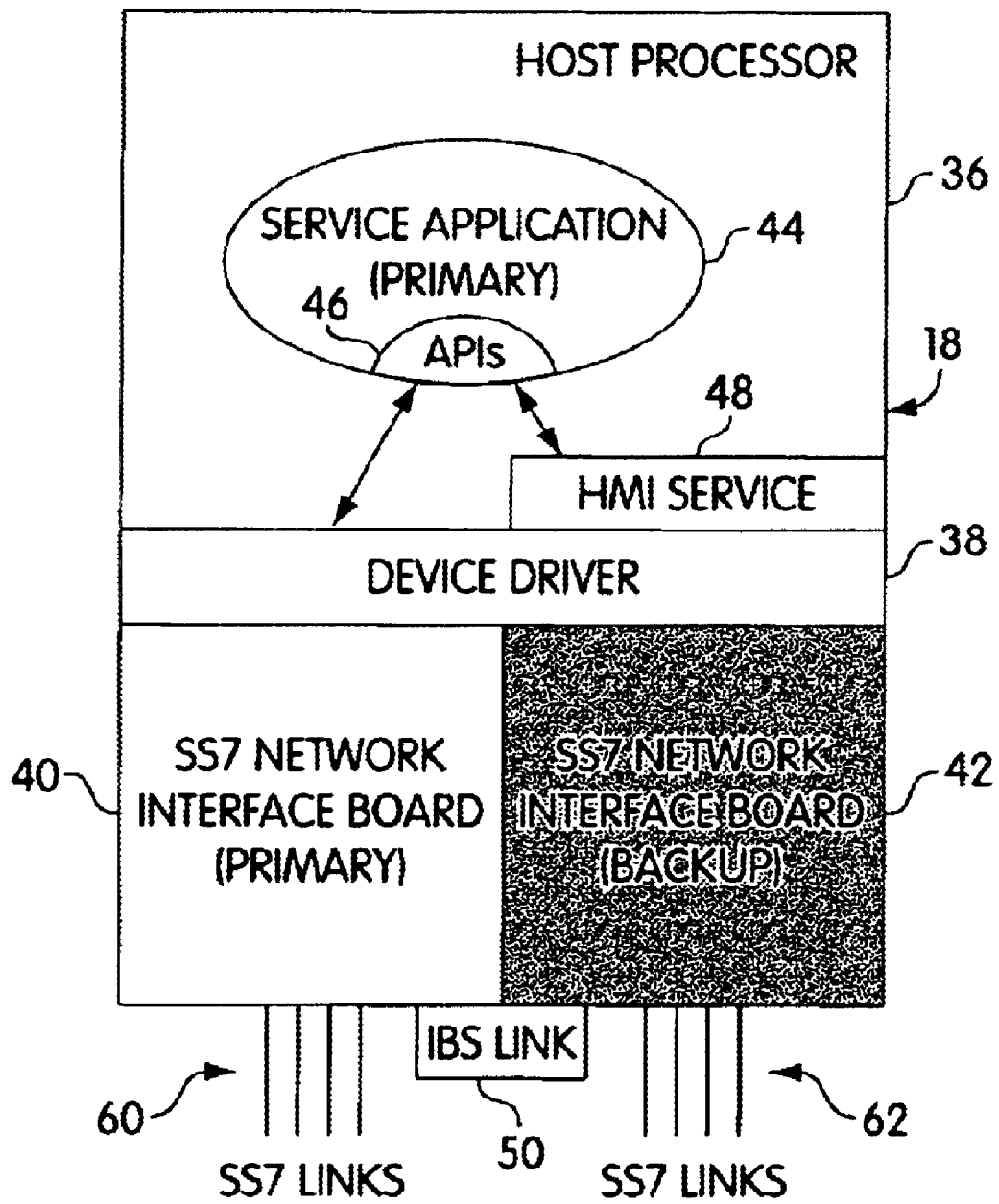
FIG. 2 is a block diagram of a single-chassis service switching point of the system shown in FIG. 1.

Referring to FIG. 2, the SSP 18 includes a host processor 36, a device driver 38, and independent redundant SS7 network interface boards 40, 42. The host processor 36 includes appropriate memory for storing software to implement a service application 44, including appropriate application program interfaces (APIs) 46, and an HMI (Health Management Interface) service 48. The service application 44 provides the services of the SSP 18, e.g., voicemail or 800 number services. The HMI service 48 monitors for heartbeat messages from the board 40 and accepts commands from service and/or management applications to control the operation of the board 40 with respect to being primary/ backup, active/inactive, etc. The device driver 38 provides access to the SS7 interface board 40 and hides the low-level hardware details from the applications. Although the boards 40, 42 are shown schematically in the SSP 18, redundant interface boards may instead, or also, be found in any of the network components, STPs 14, SSPs 18, 20, IP 22, SN 24, gateway 32, and/or SCP 16.

The interface boards 40, 42 are here shown in a common computer chassis and are connected by an inter-board communication (IBC) link 50. The IBC link 50 may be a local area network (LAN) and can allow the exchange of network traffic and status messages. The boards 40, 42 are configured to process data as described below and to exchange information with each other through the link 50 and with other portions of the system 10 through SS7 links 60, 62.

Figure 3:
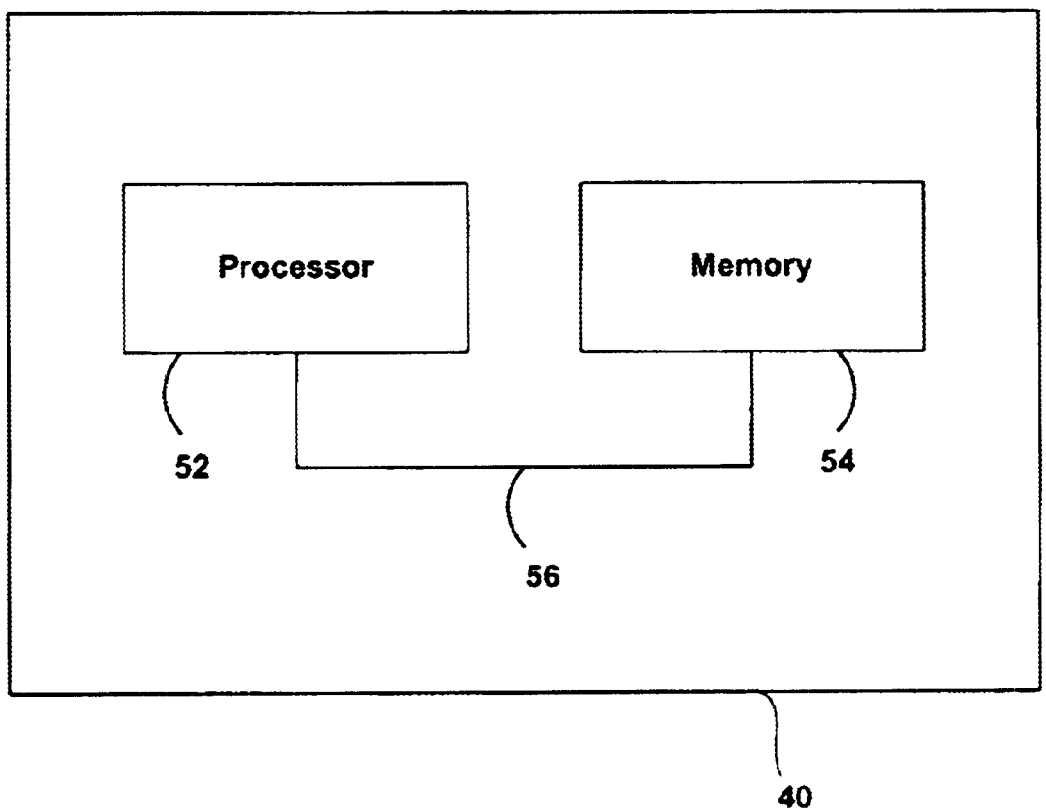
FIG. 3 is a block diagram of portions of an SS7 network interface board shown in FIG. 2.
Figure 4:
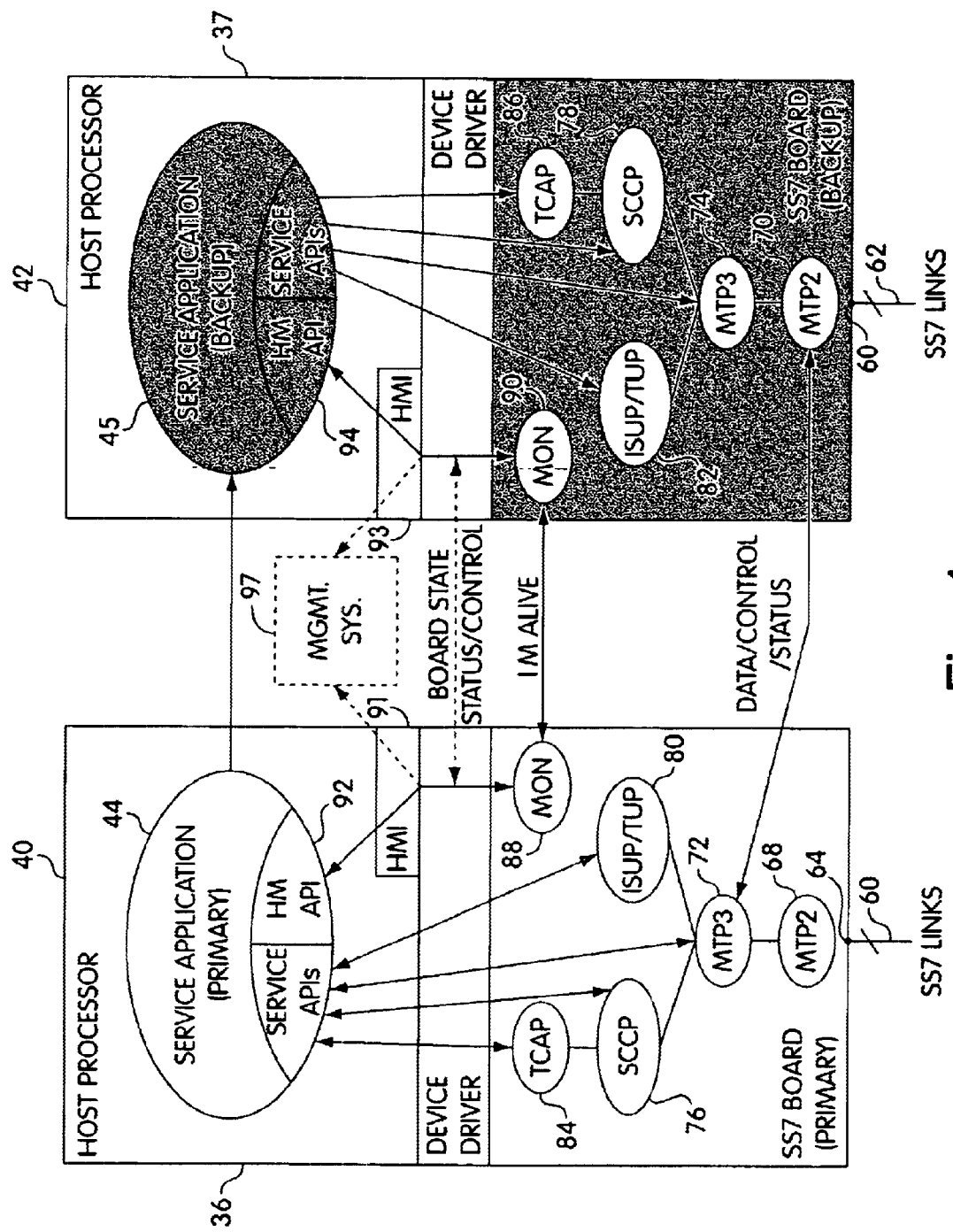
FIG. 4 is a functional block diagram of primary and backup SS7 interface boards of a service switching point of the system shown in FIG. 1.

Each board 40, 42 contains a processor for executing independent copies of the SS7 protocol stack. Referring to FIG. 3, the interface board 40 includes a processor 52 and memory 54. The processor 52 can be a personal computer central processing unit (CPU) such as a Pentium® III processor made by Intel® Corporation. Memory 54 includes random access memory (RAM) and read-only memory (ROM). The processor 52 and the memory 54 are connected by a bus 56. The interface board 40 can store, e.g., in the memory 54, software code containing instructions for controlling the processor 52 to perform functions described above and below. Referring to FIG. 4, the boards 40, 42 implement the SS7 protocol stack, including physical interfaces 64, 66 to the SS7 links 60, 62, Message Transfer Parts layer 2 (MTP2) 68, 70, Message Transfer Parts layer 3 (MTP3) 72, 74, Signal Connection Control Parts (SCCP) 76, 78, IDSN User Part/Telephone User Parts (ISUP/TUP) 80, 82, and Transaction Capabilities Application Parts (TCAP) 84, 86. The physical interfaces 64, 66, and the MTP2 layers 68, 70 are referred to as "lower" layers and the other portions of the SS7 protocol stack as "upper" layers, e.g., with the physical interfaces 64, 66 "below" the MTP2 layers 68, 70, and the SCCPs 76, 78 "above" the MTP3 layers 72, 74, etc. The boards 40, 42 also include software monitoring modules (MON) 88, 90. Operation of the SS7 protocol stack is governed by various national and international standards.

SS7 Protocol Stack Layers

The MTP2 modules 68, 70 implement data link layer functions—packet sequencing, error detection and correction, and flow control—relating to each signaling link. Information regarding the current status of each signaling link—known as the link state—is local to that signaling link and need not be replicated within the SEP 18 (FIG. 2). The MTP2 link state includes in-service/out-of-service, aligned/not-aligned, and whether a local processor outage condition is indicated locally, remotely, both, or neither.

The MTP3 modules 72, 74 are responsible for routing, distribution, and management of traffic from/to the SEP 18 (FIG. 2) through the signaling links 60, 62 terminating on the SEP 18. This includes load sharing traffic across available links 60, 62 as well as rerouting traffic away from failed links or signaling nodes. To perform their functions in compliance with the various national and international SS7 standards, the MTP3 modules 72, 74 are configured to maintain state information regarding the status of all signaling links terminating at the SEP 18, as well as the status of other network nodes with which the MTP3 modules 72, 74 are concerned. The MTP3 link state includes information regarding whether the link is disabled, inactive but not disabled, or active, whether traffic is inhibited (for management reasons) locally, remotely, both, or neither, and whether a local processor outage condition is indicated locally, remotely, both, or neither. This state information is replicated across both boards 40, 42 to help ensure that the SEP 18 operates in accordance with those standards in the event of a failure of one of the SS7 interface boards 40, 42. The MTP3 layers 72, 74 are configured to initialize their internal states to default states indicating that all links are active and all destinations are available.

The ISUP modules 80, 82 are configured to handle call setup, supervision, and tear-down for circuit-switched calls, under control of the service applications 44, 45. The ISUP modules 80, 82 are configured to maintain in memory the state of each call in progress, as well the state of each voice circuit under its control, that may be either in-service or blocked (by the exchange at either end of the circuit, or both) for maintenance purposes. The ISUP layers 80, 82 are configured to initialize their internal states to default states indicating that all links are inactive and that all destinations are unavailable.

The SCCP layers 76, 78 are configured to provide both unreliable connectionless and reliable connection-oriented data transfer services to the service applications 44, 45. In addition to data transfer and connection management, the SCCP layers 76, 78 are also configured to track the state of peer applications at other SEPs on behalf of the service applications 44, 45. The SCCP layers 76, 78 are configured to initialize their internal states to default states indicating that all destinations are accessible, all remote subsystems are available, and no connections are active.

The TCAP layers 84, 86 provide transaction services to the service applications 44, 45. These layers 84, 86 have memories that include the status of outstanding transactions at any given point in time. The TCAP layers 84, 86 are configured to initialize their internal states to default states indicating that no transactions are active.

Monitoring Modules

The MON modules 88, 90 are responsible for monitoring the status of each of the SS7 layer modules 68, 72, 76, 80, and 84, and 70, 74, 78, 82, and 90, respectively. The modules 88, 90 are also responsible for monitoring the status of the other SS7 interface board 42, 40, respectively (via the IBC link 50) and periodically reporting their status to the host processors 36, 37.

Each host computer 36, 37 also contains a monitoring and control module (HMI service) 91, 93, in addition to the service application 44, 45. The HMI services 91, 93 monitor the status of each SS7 interface board 40, 42 in the chassis and report any changes in status, such as a failure of a software module on the board 40, 42 or a failure of the board 40, 42 itself, to the service application 44, 45 and/or a separate management system 47. Communication between the service applications 44, 45 and the HMIs 91, 93 is facilitated by HM APIs (Application Program Interfaces) 92, 94.

Active-Active and Active-Backup Arrangements

The redundant boards 40, 42 are configured to both be active for portions of the SS7 protocol and configured such that the board 40 is active and the board 42 is a backup for other portions of the SS7 protocol. Which board is the active board and which is the backup board can be designated by the service applications 44, 45, or by an independent management application. The backup board 42 receives state updates from the active board 40 through the link 50 to keep the backup board 42 ready to quickly transition to being the active board, e.g., if the active board 40 fails or is taken off-line for an upgrade.

At the MTP2 layer 68, 70 and below, the protocol stacks operate in an active-active arrangement, with live links carrying active traffic terminated on both boards 40, 42 concurrently. Both the active and backup boards 40, 42 process information at the lower protocol layers. This helps eliminate switchover time (interruption of traffic while activating backup links) if the active board 40 fails or is otherwise removed from being the active board (e.g., for a live upgrade). In the active-active condition, the backup board 42 processes data though the physical layer 66 and the MTP2 layer 70 and transfers these data to the primary board 40 for upper-layer processing.

At the MTP3 layer 72, 74 and above, the independent protocol stacks operate in a primary/backup arrangement. Each upper layer exists in both the primary, active, board 40 and in the backup board 42. The boards 40, 42 are configured such that, as ISUP calls, or SCCP connections, or TCAP transactions progress, each of the upper layers 72, 76, 80, 84 of the primary, active, board 40 updates the memory of the corresponding layer 74, 78, 82, 86 in the backup board 42 with the current network and/or service state by sending checkpoint messages across the IBC link 50 to the backup board 42. The checkpoint messages include MTP-level network status, SCCP route and subsystem status, ISUP/TUP call states, SCCP connection states, and TCAP transaction states. Less than all information available can be sent to the backup board 42. Preferably, only the information needed to provide a quick and transparent transfer from the primary board 40 to the backup board 42, and not all information in the primary board 40, is transferred to the backup board 42. The SEP 18 is configured such that upon failure of the primary board 40 (hardware or software), or other removal of the primary board 40 from active status, the backup 42 is switched to become the active board. The backup 42 takes over operation with the current network state, preserving active calls, connections, and/or transactions.

Checkpoint Messages

The checkpoint messages provided by the primary board 40 to the backup board 42 vary depending upon the layer of the SS7 protocol stack. Thus, each software module is configured to checkpoint information appropriate for its corresponding protocol stack layer.

For the MTP3 layer 72, 74, the MTP3 module 72 transfers checkpoint information to the MTP module 74 in response to a change in state of a signaling link. Changes in state include a signaling link coming into or going out of service due to operator action, link failure (such as a cable cut) or recovery, excessive error rate on the link, or action initiated by the signaling point (e.g., STP or SEP) at the remote end of the link. State changes also include a signaling link entering or exiting a processor-outage condition due to either local operator action or an action at the remote end of the link. State changes further include a signaling link entering or exiting an inhibited condition due to either local operator action or an action at the remote end of the link, or due to the change in status of another link (e.g., an alternative link fails). In these cases, the checkpoint information includes the link number of the link changing states and the new link state of the link.

The MTP3 module 72 also transfers checkpoint information to the MTP module 74 in response to a change in the accessibility or preferred route to any other signaling point in the system 10. The change in the accessibility or preferred route can be detected by the receipt of MTP3 network management messages, such as TFP/TFR/TFA messages, or by the change in status of signaling links as described above. In these cases, both the signaling point code (address) of the affected destination and the signaling point code of the adjacent STP that will now be used or avoided is checkpointed to the backup MTP3 module 74 in order to help insure correct operation (minimized message loss) in case of a failure of the primary MTP3 module 72. TFP stands for Transfer Prohibited and indicates that the STP cannot be used to reach the requested destination SEP. TFR stands for Transfer Restricted and indicates that the STP should only be used to reach the requested destination SEP if no other route is available. TFA stands for Transfer Allowed and cancels a prior TFR or TFP.

The ISUP layer 80 transmits checkpoint information to its backup 82 at certain transitions in the call state, as determined by messages sent by the service application 44 and/or received from the SS7 network. Checkpoints to the backup 82 are provided in response to a call becoming answered or being released. In these cases, the circuit identification code (CIC) and new call state and direction (inbound or outbound) are transferred to the backup module 82. Calls that are in transient, or unstable, states may also be checkpointed, at the discretion of the service application 44.

In addition, ISUP checkpointing is performed in response to a circuit being blocked (or unblocked) for maintenance purposes either by local operator action or action at the exchange at the remote end of the circuit. In these cases, the CIC, the new circuit state (blocked, unblocked), and the side initiating the block (local, remote, or both) is checkpointed.

The SCCP module 76 maintain active connection state, and remote signaling point and subsystem status in the backup module 78 through the use of checkpoint messages. Preferably, the minimum amount of data necessary is checkpointed to allow the backup board 42 to continue operation of the SCCP service in the case of a failure or planned outage of the primary. Connections are logical connections of applications (sessions for data exchange).

Network status is maintained by SCCP-layer checkpointing of various events. These events include MTP-PAUSE and MTP-RESUME from local MTP for which affected point code and new status are checkpointed. For Subsystem Prohibited (SSP) and Subsystem Allowed (SSA) from remote nodes, the affected point code, affected subsystem number, and new status are checkpointed. For subsystem (application) in-service or out-of-service requests from local applications, the local subsystem number and new status are checkpointed.

Connections are maintained in the backup module 78 by checkpoint messages in response to a new connection, incoming or outgoing, being confirmed or released. Connection checkpoint data includes calling and called SCCP addresses (point code, subsystem number, and/or global title), connection direction, connection service class, source and destination local references, signaling link selection (SLS) value used by the connection to maintain message ordering, and owning application identity (i.e., which service application or local node is connected to the session).

The TCAP module 84 uses checkpoint messages to replicate the state of, preferably all, open transactions in the backup module 86. In response to the first message initiating a transaction, from either the service layer 44 or from the SS7 network, the primary TCAP module 84 checkpoints information derived from the first message to the backup module 86. This TCAP checkpoint information includes source transaction ID, destination transaction ID, transaction state, source address (signaling point code, subsystem number, and/or global title), and destination address (signaling point code, subsystem number, and/or global title). The transaction IDs are IDs assigned by the transmitting and receiving nodes. In response to subsequent checkpoints related to the same transaction, such as when the transaction has been completed and may be deleted from memory, preferably only, the transaction identifier and the new transaction state are checkpointed.

Failure Detection

Heartbeat ("I'm alive") messages can be sent to/from the MON processes 88, 90 to help detect failures of modules, boards, and/or the IBC link 50 (FIG. 2). Each module on the SS7 interface boards 40, 42 sends periodic heartbeat ("I'm alive") messages to the MON process 88, 90 on its local board. A threshold amount of time passes without a heartbeat message being received indicates a failure. The use of heartbeat messages allows for the detection of software errors such as illegal instruction or memory references as well as errors such as tight loops which are not typically detected by traditional operating systems. The MON processes 88, 90 also send periodic heartbeat messages to the HMI service modules 91, 93 of the respective host processors 36, 37. Each board 40, 42 also monitors the status of the IBC link 50 (FIG. 2) by periodically exchanging heartbeat messages with its mate board.

Operation

Figure 5:
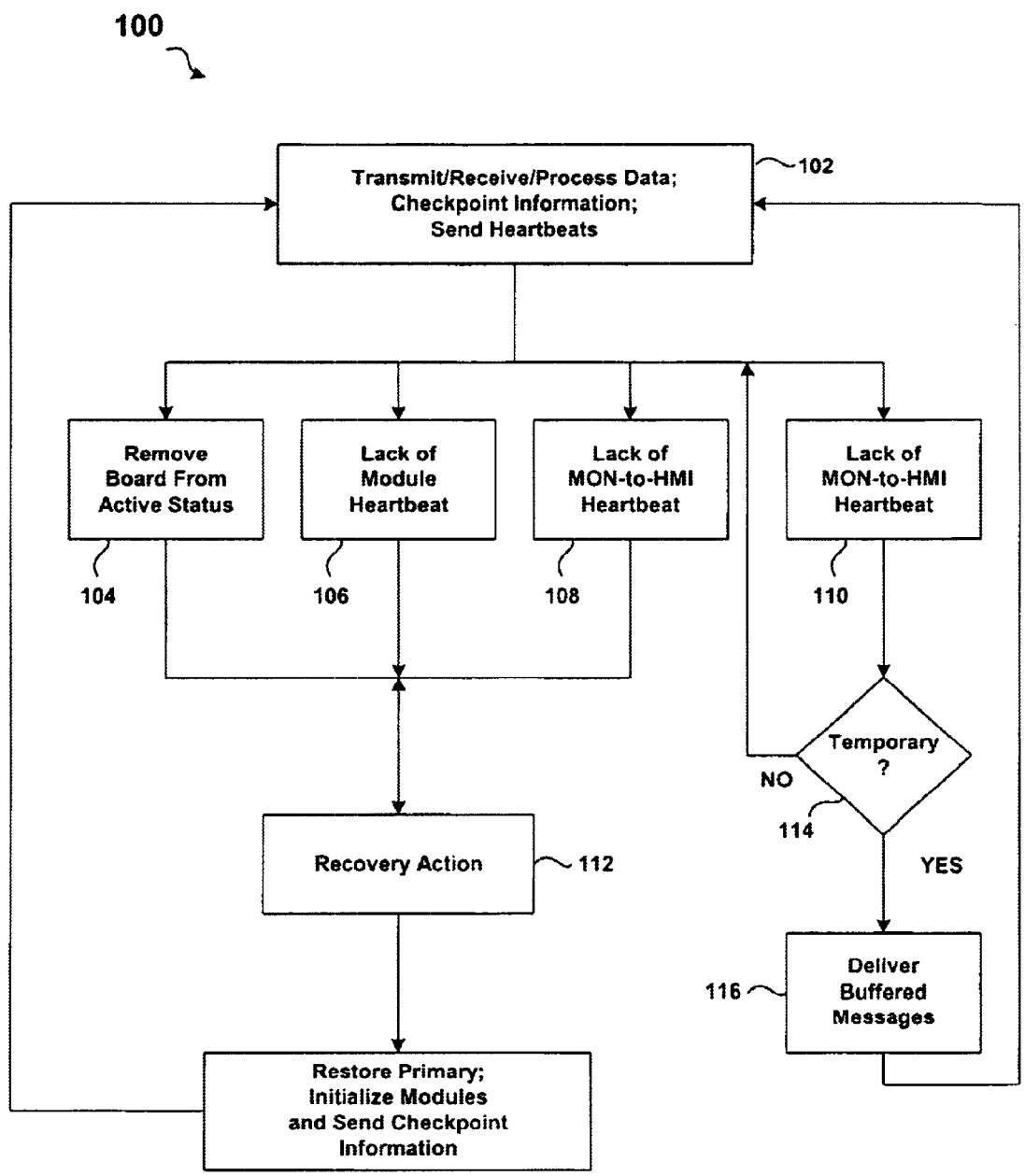
FIG. 5 is a block flow diagram of operation of the primary and backup SS7 interface boards shown in FIG. 4.

Referring to FIG. 5, with further reference to FIGS. 1 and 4, a process 100 of operating the boards 40, 42 includes stages for normal operation and for recovering in case of failure or other removal of the primary board 40 from normal operation and restoration of the primary board 40. At stage 102, the boards 40, 42 operate normally, transmitting, receiving, and processing data. In this stage, the boards 40, 42 checkpoint appropriate information according to each module 72, 74, 76, 78, 80, 82, 84, 86. The modules 72, 74, 76, 78, 80, 82, 84, 86 also transmit heartbeat messages to the MON modules 88, 90. The MON modules 88, 90 transmit heartbeat messages to the HMIs 91, 93. This continues unless and until a board becomes, or will imminently become, inactive, e.g., as one or more of stages 104, 106, 108, 110 occur. A board 40, 42 is inactive if it is not processing information in at least some, and preferably all, upper layers of the SS7 protocol stack even if the board 40, 42 is not incapable of processing information in these layers. An active board 40, 42 processes information in each of its configured layers.

At stage 110, the MON process 88, 90, that each monitor the status of the IBC link 50 by periodically exchanging heartbeat messages with its mate board, detects a lack of a heartbeat message from its associated MON module 90, 88. If the IBC link 50 fails, any received messages not yet transmitted to the MTP3 module 72 on the primary board 40 are buffered, and the MTP2 links 62 terminated on the backup board 42 are placed into a local processor outage (LPO) condition, continuously transmitting processor outage status messages to the adjacent signaling point. This forces the SS7 network to route messages destined for those links 62 to alternate paths, guarding against the loss of messages and disruption of the service while the IBC link 50 is unavailable. It also keeps the links 62 in an active state for quick (preferably immediate) restoration of traffic (without link realignment) once the IBC link 50 is restored.

At stage 114, it is determined whether the IBC link failure is temporary. If the IBC link failure is temporary and comes back into service within a prescribed time period, at stage 116 buffered messages are delivered to the primary MTP3 module 72 for processing. Links 62 terminated on the backup board 42 are restored, preferably immediately, to service by removing the LPO condition.

If the IBC link failure is not temporary, the process 100 proceeds to determine a cause for the IBC link failure. If the IBC link failure is due to imminent or current removal of the primary board 40 from active status, or a failure of the primary board 40 itself, this is detected in stages 104, 106, 108.

At stage 104, either the primary board 40 or the backup board 42 is removed from active status. An indication that this will soon occur or is occurring is conveyed to the service application 45, 44 of the other board 42, 40, respectively, (or to the controlling system 47). In response to this indication, recovery action is taken at stage 112 discussed below.

At stage 106, a MON module 88, 90 detects a lack of a heartbeat message from one or more of its associated modules 72, 74, 76, 78, 80, 82, 84, 86. If the MON process 88, 90 detects that no heartbeat message has been received from an SS7 module 72, 74, 76, 78, 80, 82, 84, 86 for a prescribed period of time, the module is declared dead and the service application 44, 45, and/or separate system management application 47 is notified and may take recovery action at stage 112. Recovery action may or may not be taken based, e.g., on whether the detected lack of a heartbeat message is indicative of a situation that is tolerable, such that the corresponding board 40, 42 may continue operating as is.

At stage 108, an HMI 91, 93 detects a lack of a heartbeat message from its associated MON module 88, 90. The absence of heartbeat messages for a prescribed period of time is interpreted as a failure of the MON process 88, 90 or of the board 40, 42 itself, and is reported to the service application 44, 45 and/or system management application 47. The notified application, 44, 45, 47 may take appropriate action at stage 112.

At stage 112, recovery action is taken as appropriate. If the primary board 40 failed, recovery action typically involves switching the backup board 42 into primary mode to continue service operation, while re-initializing the software modules 68, 72, 76, 80, 84, 88 on the failed board 40. The lower layers 64, 68 of the previously-active board 40 can convey information between the links 60 and the MTP3 layer 74 of the now-primary board 42. If the links 62 of the backup board 42 had been placed in the LPO condition and traffic buffered on the board 42, the signaling links 62 are immediately removed from their LPO state and traffic is resumed through the new primary board 42 first with any traffic buffered before the IBC link failure and then with newly-received traffic.

At stage 114, for the board 40 that has been restored to service as the new backup, for example due to a software failure and reload or due to a software upgrade of the board 40, each of the new backup board's SS7 modules' in-memory representation of network/call/connection/ transaction state are updated via the IBC link 50 to mirror the sate of the new primary board 42. Each of the SS7 layers does this independently by initializing its internal states to each layer's corresponding pre-determined default states, and independently requesting its new primary module 74, 78, 82, 86 to reproduce checkpoint messages to bring its backup layer's state up to date. This latter operation is done using the same checkpoint messages that would occur during normal processing. Since this checkpointing may require thousands of messages, the update checkpoints are delivered on a timed basis, intermixed with normal checkpoint messages caused by ongoing traffic. If the backup board 42 is the board taken out of service due to failure or otherwise, then the board 42 is brought back to backup operation by re-initializing the board 42 and checkpointing information from the primary 40 to the backup 42.

Figure 6:
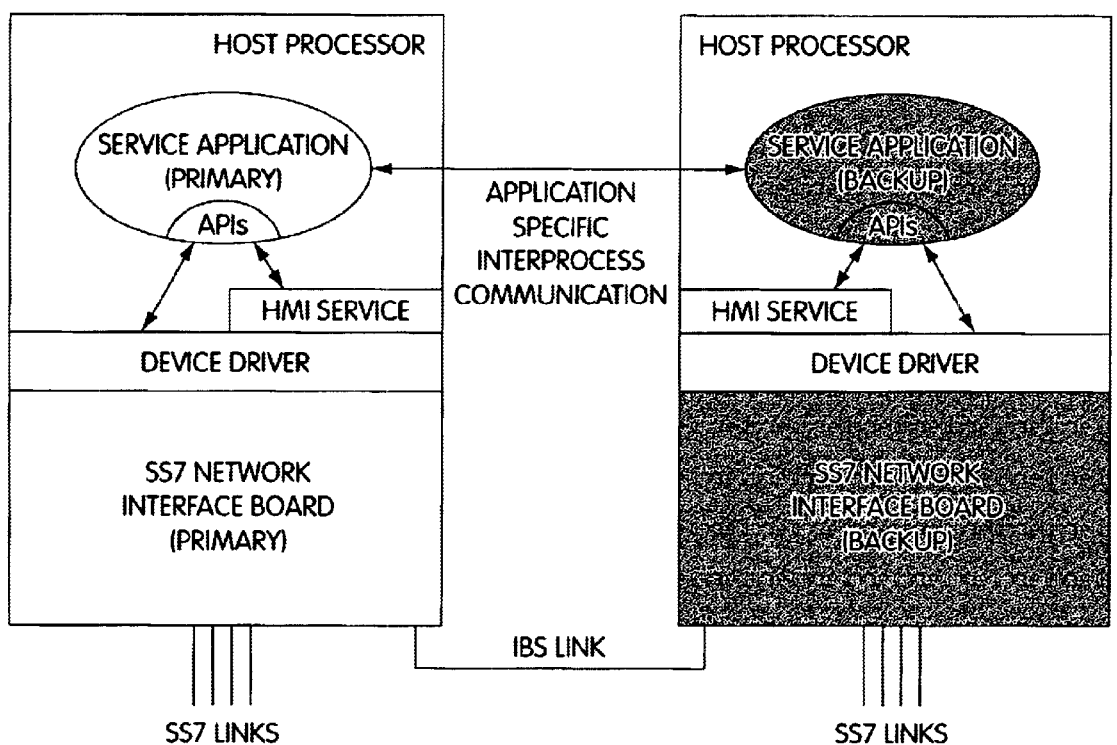
FIG. 6 is a functional block diagram of primary and backup SS7 interface boards, in separate chassis, of a service switching point of the system shown in FIG. 1.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The boards may reside in a single computer chassis (FIG. 2) or in separate computer chassis as shown in FIG. 6. The service applications 44, 45 may be implemented as a single application, especially if the boards reside in a single computer chassis. Although only one gateway is shown in FIG. 1, more gateways may be provided and connected to other types of networks.

What is claimed is:

1. A signaling system 7 (SS7) processing system for use in a SS7 network, the system comprising:
    a primary interface configured to process communications according to at least one layer of the SS7 protocol stack, the primary interface being configured to provide checkpoint messages relating to the communications and the at least one layer of the SS7 protocol stack, each layer of the at least one layer of the SS7 protocol stack having a corresponding set of information associated with each communication; and
    a backup interface configured to process communications according to the at least one layer of the SS7 protocol stack, the backup interface being coupled to the primary interface, and configured, to receive the checkpoint messages from the primary interface;
    wherein the checkpoint messages contain sufficient information for the backup interface to properly process communications that are transferred from being processed by the primary interface to being processed by the backup interface and contain less than all information in each set of information associated with each of the communications corresponding to the at least one layer of the SS7 protocol stack.

2. The system of claim 1 wherein the primary interface and the backup interface are each configured to process communications according to at least two layers of the SS7 protocol stack.

3. The system of claim 2 wherein the primary interface and the backup interface are each configured to process communications according to message transfer part 3 (MTP-3), signal connection control part (SCCP), integrated services digital network user part/telephone user part (ISUP/TUP), and transaction capabilities application part (TCAP) layers of the SS7 protocol stack.

4. The system of claim 3 wherein the backup interface is configured to initialize the MTP-3, SCCP, ISUP/TUP, and TCAP layers to default conditions.

5. The system of claim 4 wherein the backup interface is configured to request update checkpoint messages from the primary interface to alter the MTP-3, SCCP, ISUP/TUP, and TCAP layers of the backup interface from the default conditions.

6. The system of claim 5 wherein the backup interface is configured such that the MTP-3, SCCP, ISUP/TUP, and TCAP layers of the backup interface independently request the update checkpoint messages from corresponding layers of the primary interface.

7. The system of claim 5 wherein the backup interface is configured to request the update checkpoint messages in response to the backup interface being restored to service.

8. The system of claim 5 wherein the primary interface is configured to provide the update checkpoint messages intermixed with normal-operation checkpoint messages.

9. The system of claim 1 wherein the checkpoint messages contain only information sufficient for the backup interface to properly process communications that are transferred from being processed by the primary interface to being processed by the backup interface.

10. The system of claim 9 wherein the at least one layer includes a message transfer part (MTP-3) layer and wherein the primary interface is configured to provide a first MTP-3 checkpoint message portion, of a checkpoint message, consisting of a link number and a new link state associated with a signaling link over which the associated communication is transferred in response to the signaling link changing states, and wherein the primary interface is configured to provide a second MTP-3 checkpoint message portion, of a checkpoint message, consisting of an address of a destination signaling portion in the SS7 network and an address of a signal transfer point adjacent to the destination signaling point in response to at least one of accessibility of and a preferred route to the destination signaling point changing.

11. The system of claim 9 wherein the at least one layer includes a message transfer part (MTP) and a signaling connection control part (SCCP) layer and wherein the primary interface is configured to provide, in response to changes in status of the SS7 network, an SCCP network-status checkpoint message portion, of a checkpoint message, checkpointing MTP-pause and MTP-resume local to the primary interface in the SS7 network, SSA and SSP remote from the primary interface in the SS7 network, and subsystem in-service and subsystem out-of-service requests from an application local to the primary interface in the SS7 network.

12. The system of claim 9 wherein the at least one layer includes a signaling connection control part (SCCP) layer and wherein the primary interface is configured to provide, in response to a communication connection being confirmed or released, an SCCP connection checkpoint message portion, of a checkpoint message, including calling and called SCCP addresses, connection direction, connection service class, source and destination local references, SLS value, and identity of an application local to the primary interface in the SS7 network.

13. The system of claim 9 wherein the at least one layer includes a transaction capabilities application part (TCAP) layer and wherein the primary interface is configured to provide a TCAP checkpoint message portion, of a checkpoint message, to replicate states of open transactions in the backup interface.

14. The system of claim 13 wherein the TCAP checkpoint message portion consists of, in response to a call being initiated, source transaction identity, destination transaction identity, transaction state, source address, and destination address.

15. The system of claim 13 wherein the TCAP checkpoint message portion consists of, after a call has been initiated, transaction identity.

16. The system of claim 1 wherein the primary and backup interfaces are disposed in a common computer chassis.

17. The system of claim 1 wherein the primary and backup interfaces are disposed in separate computer chassis.

18. The system of claim 1 wherein the backup is configured to assume processing of communications previously being processed by the primary interface in response to the primary interface changing from active to at least imminently inactive status.

19. A signaling system 7 (SS7) processing system for use in an SS7 network, the system comprising:
    a primary interface configured to process communications according to at least a physical-interface layer, a message transfer part 2 (MTP-2) layer and an MTP-3 layer of the SS7 protocol stack, the physical-interface layer of the primary interface being coupled to first SS7 links for conveying information between the primary interface and other portions of the SS7 network; and a backup interface configured to process communications according to the at least the physical-interface layer and the MTP-2 layer of the SS7 protocol stack, the backup interface being coupled to the primary interface to transfer data between the MTP-2 layer of the backup interface and the MTP-3 layer of the primary interface, the physical-interface layer of the backup interface being coupled to second SS7 links for conveying information between the backup interface and other portions of the SS7 network;

wherein the primary and backup interfaces are configured to have the physical-layer interfaces of both the primary and backup interfaces concurrently convey information to and from the first and second SS7 links, respectively.

20. The system of claim 19 wherein the primary and backup interfaces are configured to process communications according to the at least the physical-interface layer, the MTP-2 layer, the MTP-3 layer, and SCCP layer, an ISUP/TUP layer, and a TCAP layer of the SS7 protocol stack.

21. The system of claim 20 wherein the backup interface is configured to, while the primary interface is active, process information received from the second SS7 links through the MTP2 layer and convey the processed information to the MTP-3 layer of the primary interface.

22. The system of claim 19 wherein the primary and backup interfaces are configured such that the physical layers and MTP2 layers of both interfaces can convey information to active upper layers of the other interface.

23. The system of claim 19 wherein the backup interface includes a buffer, the backup interface being configured to store the information received via the second SS7 links in the buffer in response to an interface-communications failure between the primary and backup interfaces via an interface link coupling the primary and backup interfaces.

24. The system of claim 23 wherein the backup interface is configured to provide processor-outage indicia, associated with the second SS7 links, to a signaling point in the SS7 network adjacent to the backup interface in response to the interface-communications failure.

25. The system of claim 24 wherein the backup interface is configured to stop providing processor-outage indicia, associated with the second SS7 links, to the signaling point in the SS7 network adjacent to the backup interface in response to the interface-communications failure ceasing.

26. The system of claim 24 wherein the backup interface is configured to switch to a primary mode and to stop providing processor-outage indicia, associated with the second SS7 links, to the signaling point in the SS7 network adjacent to the backup interface in response to the primary interface being at least imminently inactive.

27. The system of claim 19 wherein the primary and backup interfaces are disposed in a common computer chassis.

28. The system of claim 19 wherein the primary and backup interfaces are disposed in separate computer chassis.

29. The system of claim 19 wherein the backup is configured to assume processing of communications previously being processed by the primary interface in response to the primary interface changing from active to at least imminently inactive status.

30. A signaling system 7 (SS7) processing system for use in an SS7 network, the system comprising:

a primary interface configured to process communications according to at least a physical-interface layer, a message transfer part 2 (MTP-2) layer and an MTP-3 layer of the SS7 protocol stack, the physical-interface layer of the primary interface being coupled to first SS7 links for conveying information between the primary interface and other portions of the SS7 network, the primary interface being configured to provide checkpoint messages relating to the communications and the MTP-3 layer of the SS7 protocol stack, the MTP-3 layer having a corresponding MTP-3 set of information associated with each communication, the primary interface being configured to communicate with a first service application; and a backup interface configured to process communications according to the at least the physical-interface layer, the MTP-2 layer and the MTP-3 layer of the SS7 protocol stack, the backup interface being coupled to the primary interface to transfer data between the MTP-2 layer of the backup interface and the MTP-3 layer of the primary interface, the physical-interface layer of the backup interface being coupled to second SS7 links for conveying information between the backup interface and other portions of the SS7 network, the backup interface being coupled to the primary interface, and configured, to receive the checkpoint messages from the primary interface, the backup interface being configured to communicate with a second service application;

wherein the primary and backup interfaces are configured to have the physical-layer interfaces of both the primary and backup interfaces concurrently convey information to and from the first and second SS7 links, respectively; and wherein the checkpoint messages contain sufficient information for the backup interface to properly process communications that are transferred from being processed by the primary interface to being processed by the backup interface and contain less than all information in each MTP-3 set of information associated with each of the communications corresponding to the MTP-3 layer of the SS7 protocol stack.

31. The system of claim 30 wherein the primary interface and the backup interface are each configured to process communications according to signaling connection control part (SCCP), integrated services digital network user part/telephone user part (ISUP/TUP), and transaction capabilities application part (TCAP) layers of the SS7 protocol stack.

32. The system of claim 31 wherein the primary interface is configured to provide checkpoint messages relating to the communications and each of the SCCP, ISUP/TUP, and TCAP layers of the SS7 protocol stack, each layer having a corresponding set of information associated with each communication.

33. The system of claim 32 wherein the checkpoint messages contain only information sufficient for the backup interface to properly process communications, according to each layer, that are transferred from being processed by the primary interface to being processed by the backup interface.

34. The system of claim 30 wherein the primary and backup interfaces are disposed in a common computer chassis and the first service application is the second service application.

35. The system of claim 30 wherein the primary and backup interfaces are disposed in separate computer chassis and the first and second service applications are separate.

36. The system of claim 30 wherein the backup is configured to assume processing of communications previously being processed by the primary interface in response to the primary interface changing from active to at least imminently inactive status.

* * * * *